(12) United States Patent
Wei et al.

(10) Patent No.: US 8,929,945 B1
(45) Date of Patent: Jan. 6, 2015

(54) TRANSCEIVERS WITH A TRANSFORMER SUPPORTING MULTIBAND OPERATION

(71) Applicant: MStar Semiconductor, Inc., Hsinchu Hsien (TW)

(72) Inventors: Hung-Ju Wei, Hsinchu Hsien (TW); Bo-Jiun Chen, Hsinchu Hsien (TW); Chih-Ming Hung, Mckinney, TX (US)

(73) Assignee: MStar Semiconductor, Inc., Hsinchu Hsien (TW)

( * ) Notice: Subject to any disclaimer, the term of this patent is extended or adjusted under 35 U.S.C. 154(b) by 62 days.

(21) Appl. No.: 13/945,222

(22) Filed: Jul. 18, 2013

(51) Int. Cl.
  *H04B 1/40* (2006.01)
  *H04W 88/06* (2009.01)
  *H04B 1/12* (2006.01)
  *H04B 1/00* (2006.01)

(52) U.S. Cl.
  CPC ..................... *H04B 1/005* (2013.01)
  USPC ......... 455/552.1; 455/77; 455/78; 455/279.1; 330/165; 330/188; 330/195

(58) Field of Classification Search
  CPC ........ H04B 1/0458; H04B 1/581; H03H 7/42; H01P 5/10; H03F 2200/53; H03F 2200/537; H03F 2200/541
  USPC .................... 455/77, 78, 552.1–553.1, 279.1; 330/165, 188, 195
  See application file for complete search history.

(56) References Cited

U.S. PATENT DOCUMENTS

| 5,528,630 | A  | * | 6/1996  | Ashley et al. ............... 375/258 |
|-----------|----|---|---------|--------------------------------------|
| 7,728,661 | B2 | * | 6/2010  | Bockelman et al. ............ 330/51 |
| 7,999,613 | B2 | * | 8/2011  | Burns et al. .............. 330/124 R |
| 8,026,775 | B2 | * | 9/2011  | Meharry ...................... 333/132 |
| 8,093,950 | B2 | * | 1/2012  | Furukawa et al. ............ 330/195 |
| 8,098,095 | B2 | * | 1/2012  | Nam et al. .................... 330/195 |
| 8,604,874 | B2 | * | 12/2013 | Bendixen .................. 330/124 R |
| 8,674,764 | B2 | * | 3/2014  | Kondo ......................... 330/252 |
| 8,786,372 | B2 | * | 7/2014  | Tattershall et al. ........... 330/301 |
| 2009/0289721 | A1 | * | 11/2009 | Rajendran et al. ............ 330/301 |
| 2011/0310775 | A1 | * | 12/2011 | Khlat et al. ................... 370/278 |
| 2012/0052824 | A1 | * | 3/2012  | Mirzaei et al. ............ 455/127.2 |
| 2013/0316668 | A1 | * | 11/2013 | Davierwalla et al. ......... 455/208 |

* cited by examiner

*Primary Examiner* — Simon Nguyen
(74) *Attorney, Agent, or Firm* — WPAT, PC; Justin King

(57) ABSTRACT

Several multiband transceivers are disclosed. An exemplified multiband transceiver supporting different bands has a transformer, an inbound switch circuit, and an outbound switch circuit. The transformer has input ports on a primary side, and output ports on a secondary side. The input ports are direct-current isolated from and magnetically coupled to the output ports. The inbound switch circuit is configured to connect one of the input ports with an RF signal source for signal transmission. The outbound switch circuit is configured to connect one of the output ports with a RF output load. Optionally, an input tunable capacitor is configured to shunt with the effective inductance of one of the input ports and form a LC tank for band selection.

45 Claims, 9 Drawing Sheets

TRANSCEIVERS WITH A TRANSFORMER SUPPORTING MULTIBAND OPERATION

BACKGROUND

The present disclosure relates generally to multiband transceivers.

The growth of the usage of mobile internet and multimedia services has been explosive in recent years, as witnessed by the spur of user demands such as Web browsing, music download, movie streaming, video teleconferencing, social networking, and broadcast television. As a result, advanced mobile devices have been developed, including smart phones, PDAs, and tablet PCs, to name a few, to provide end users with versatile features and services. These mobile devices are required to support higher data rates promised by 3G WCDMA/HSPA, and even 4G LTE standards, with backward compatibility to the legacy 2G GSM and 2.5G GPRS/EDGE standards. As a recent example, the Apple iPhone 5 and iPhone 4S support quad-band GSM at 850/900/1,800/1,900 MHz, quad-band UMTS/HSDPA/HSUPA at 850/900/1,900/3,100 MHz, and dual band CDMA EV-DO Rev. A at 800/1900 MHz, for a total of six different frequency bands. Furthermore, in the 4G standard, there are more than forty bands all over the world.

While supporting a combination of frequency bands, at the same time, cost and size of mobile devices are also crucial. Discrete power amplifiers have been widely adopted in mobile handsets. For example, one handset can have a quad-band power amplifier module that supports 2G/2.5G/GPRS/EDGE systems and one to five single-band power amplifiers that support 3G WCDMA/HSPA and 4G LTE standards. Although the overall transmission performance is excellent with such multi-module configuration, there is a significant penalty in size and cost.

Converged power amplifiers are proposed to reduce the number of RF signal paths and BOM cost, as well as to simplify routing complexity at the board level. FIG. 1 shows an exemplary block diagram of a transmitter path in a smart phone utilizing converged power amplifiers. This prior art circuitry comprises a transceiver 10, a power amplifier module 12, isolators 18, an antenna switch 14, and a main antenna 16. As shown in FIG. 1, there are only two power amplifiers $22_{HB}$ and $22_{LB}$, one for high band and the other for low band, in the power amplifier module 12 to support multi-mode multi-band (MMMB) outputs. Multi-mode covers multiple standards while multi-band covers multiple bands of outputs. For example, the high-band output, provided by a high-band power amplifier $22_{HB}$, supports saturated GMSK mode and linear WCDMA/HSPA mode from 1.71 to 1.98 GHz, while the low-band output, provided by a low-band power amplifier $22_{LB}$, covers 2G/2.5G at GSM/EGSM band and 3G from 824 to 915 MHz. A post power amplifier switcher 20 routes the signals properly at each mode and each band of operation.

The transceiver 10 feeds proper RF signals at different frequency bands of operations via RF ports $RFO_{LB}$ or $RFO_{LB}$ to the power amplifier module 12. Typically, in the conventional solution, there are two pre power amplifiers (PPAs), instead of one. The amount of PPAs is proportional to numbers of supported bands or modes. FIG. 2 demonstrates a solution for a transceiver to provide two RF signals paths, capable of being connecting to the high-band and low-band power amplifiers $22_{HB}$ and $22_{LB}$ in FIG. 1, respectively. The transceiver includes a PPA 30, an inbound switch circuit 32, transformers $34_{HB}$ and $34_{LB}$, an outbound switch circuit 38, and a pair of high-band and low-band RF ports $RFO_{HB}$ and $RFO_{LB}$. Based upon band selection, the inbound switch circuit 32 routes the RF signals from the pre power amplifier 30 to the primary winding of either transformer $34_{HB}$ or $34_{LB}$, and the secondary windings of transformers $34_{HB}$ and $34_{LB}$ are respectively coupled by the outbound switch circuit 38 to the high-band and low-band RF ports ($RFO_{HB}$ and $RFO_{LO}$). The transformers, $34_{HB}$ and $34_{LB}$, are independent to each other in view of magnetic coupling. The solution proposed in FIG. 2 is easy to design for band selection and impedance ratio, because optimization of one transformer poses no influences on the other. Nevertheless, a monolithic transformer implemented in an integrated circuit chip always occupies a considerable proportion of the silicon area in a transceiver, and two monolithic transformers, as suggested in FIG. 2, is excessive and costly.

FIGS. 3A and 3B demonstrate two alternatives to the prior art solution suggested in FIG. 2, each employing only one transformer instead of two to save silicon cost. In FIG. 3A, a transformer $36_A$ has one primary winding and two secondary windings, and outbound switch circuit 42 selects and couples one of the two secondary windings based on band selection. A transformer $36_B$ in FIG. 3B has two primary windings and one secondary winding while switch circuits 32 and 40 route RF signal properly depending on either operating at high-band or low-band mode.

While each of FIGS. 3A and 3B has only one transformer, it is inevitable that they come with a penalty in either resonant tuning or loadline impedance optimization. The design difficulties are explained in FIGS. 4A and 4B. FIG. 4A shows a transformer 50 with properly-selected primary and secondary windings (51 and 53) respectively coupled to a PPA 30 and a load resistor 52. The load resistor 52 denotes the characteristic impedance $R_L$ of traces of a selected RF port. An equivalent circuit of FIG. 4A is shown in FIG. 4B, where $V_G$ represents the driven output voltage swing by PPA 30, $R_G$ represents the equivalent output impedance of the PPA 30, $C_P$ represents the capacitance of the tunable capacitor 55, $r_P$ represents the input parasitic series resistance of the primary winding 51, $k_m$ represents the coupling coefficient of the transformer 50, $L_P$ represents the inductance of the primary winding 51, $(1-k_m^2) \times L_P$ represents the leakage inductance of the primary winding 51, $k_m^2 \times L_P$ represents the mutual-coupling inductance of the transformer 50, n represents the turn ratio between the primary and secondary windings, and $R_L/(n/k_m)^2$ represents the effective load impedance transferred by transformer 50 from the secondary side to the primary side. The primary winding 51 and the tunable capacitor 55 of FIG. 4A form a LC tank, whose resonant frequency determines the center frequency of a selected band. Based on the solution shown in FIG. 3A, where $L_P$ is a constant, if the high-band frequency is 3 times higher than that of the low band, the capacitance $C_P$ of the tunable capacitor 55 needs to be tuned by 9 times to switch between high and low bands. To cover such a large capacitance tuning ratio, a large silicon area with a high die cost is required for the tunable capacitor in FIG. 3A, making the solution in FIG. 3A non-preferable. Furthermore, the quality factor of the capacitor would be low resulting in high loss and degraded performance. FIG. 3B avoids the disadvantage of FIG. 3A by using two primary windings with inductances different to each other. Accordingly, the required capacitance tuning ranges of the two capacitors in FIG. 3B can be significantly smaller. For example, the inductance $L_P$ of the primary winding 51 in FIG. 4B becomes 9 times larger and $C_P$ is kept approximately the same, to form a LC tank for a high band 3 times higher. It is worth noting that $L_S$, the inductance on the secondary side, is always the same for both high-band and low-band operations because of the common secondary winding in FIG. 3B. It can be concluded from FIG.

4B that in this scenario, the turn ratio n triples, the loadline impedance $R_L/(n/k_m)^2$ decreases, and the voltage drop $V_{COUPLE}$ across the loadline impedance $R_L/(n/k_m)^2$ changes. As the voltage drop $V_{COUPLE}$ correlates to the total output power delivered by the transformer, power added efficiency (PAE) for the solution in FIG. 3B cannot be simultaneously optimized for both high and low bands.

BRIEF DESCRIPTION OF THE DRAWINGS

The invention can be better understood by the subsequent detailed descriptions and examples with references to the accompanying drawings, wherein.

DETAILED DESCRIPTION

Figure 5:
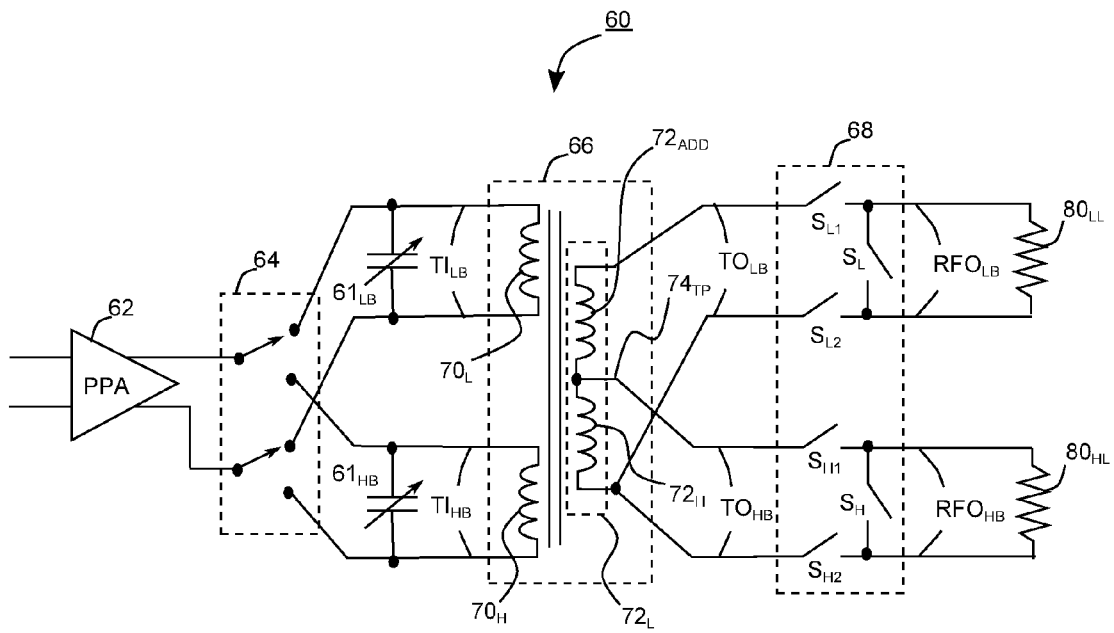
FIG. 5 exemplifies a multiband transceiver according to an embodiment of the invention.

FIG. 5 exemplifies a multiband transceiver 60 according to an embodiment of the invention, including a pre power amplifier 62, tunable capacitors $61_{HB}$ and $61_{LB}$, an inbound switch circuit 64, a trifilar transformer 66, and an outbound switch circuit 68. The pre power amplifier (PPA) 62 acts as a RF signal source. The trifilar transformer 66 has two primary windings $70_H$ and $70_L$ on the primary side and one secondary winding $72_L$ on the secondary side. All the windings in a transformer are magnetically coupled to each other, and the primary side is direct-current (DC) isolated from the secondary side. The primary windings $70_H$ and $70_L$ serve as a high-band input port $TI_{HB}$ and a low-band input port $TI_{LB}$, respectively. The two end terminals of the whole secondary winding $72_L$ form a low-band output port $TO_{LB}$. An output tap $74_{TP}$ and one end terminal of the secondary winding $72_L$ form a high-band output port $TO_{HB}$, looking into which is a segment of the secondary winding marked as $72_H$. High-band operations transmit RF signals with carrier frequencies higher than that of low-band operations.

For band selection, the inbound switch circuit 64 is inserted between the trifilar transformer 66 and the pre power amplifier 62, and the outbound switch circuit 68 follows the trifilar transformer 66. The outbound switch circuit 68 has switches $S_{L1}/S_{L2}/S_L$ and $S_{H1}/S_{H2}/S_H$ to connect or disconnect between $TO_{HB}/TO_{LB}$ and $RFO_{HB}/RFO_{LB}$. $TO_{HB}/TO_{LB}$ and $RFO_{HB}/RFO_{LB}$ are the output ports of trifilar transformer 66 and the RF ports of RF output loads ($80_{HL}$ and $80_{LL}$) in the high-band/low-band operation, respectively.

Figure 6A:
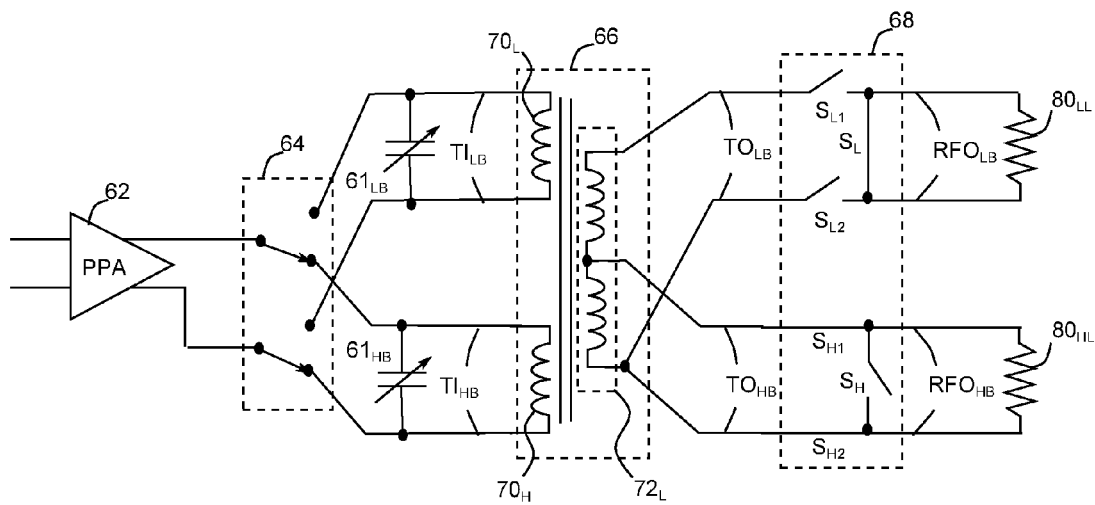
FIG. 6A shows all the switch status for inbound switch circuit 64 and outbound switch circuit 68 of FIG. 5 in high-band operation.

FIG. 6A shows all the switch status of the inbound switch circuit 64 and the outbound switch circuit 68 when multiband transceiver 60 operates at high-band frequencies. As shown in FIG. 6A, the high-band input port $TI_{HB}$ is selected by the inbound switch circuit 64 to connect to the pre power amplifier 62, while the high-band output port $TO_{HB}$ is selected by the outbound switch circuit 68 to connect to the RF port $RFO_{HB}$ for RF output load $80_{HL}$. $RFO_{HB}$ is connected to an external power amplifier in this embodiment. DC/AC coupling between the low-band input port $TI_{LB}$ and the pre power amplifier 62 is controlled through the inbound switch circuit 64, and DC/AC coupling between the low-band output port $TO_{LB}$ and the low-band RF port $RFO_{LB}$ is controlled through the outbound switch circuit 68. At the high-band operation, the low-band input port $TI_{LB}$ and the low-band output port $TO_{LB}$ are unselected, or left open, as shown in FIG. 6A. The low-band input port $TI_{LB}$ is disconnected from the pre power amplifier 62, and the low-band output port $TO_{LB}$ is disconnected from the low-band RF port $RFO_{LB}$. Inside the outbound switch circuit 68, switches $S_H$, $S_{L1}$, and $S_{L2}$ are open, and switches $S_L$, $S_{H1}$, and $S_{H2}$ are short (closed). RF signals with high-band frequencies thus follow the signal path through the pre power amplifier 62, the high-band input port $TI_{HB}$, the primary winding $70_H$ and secondary winding $72_H$ of the transformer 66, the high-band output port $TO_{HB}$ and the RF port $RFO_{HB}$ for RF output load $80_{HL}$ to reach an external power amplifier for further signal amplification and transmission, so as to perform corresponding high-band operations.

Figure 6B:
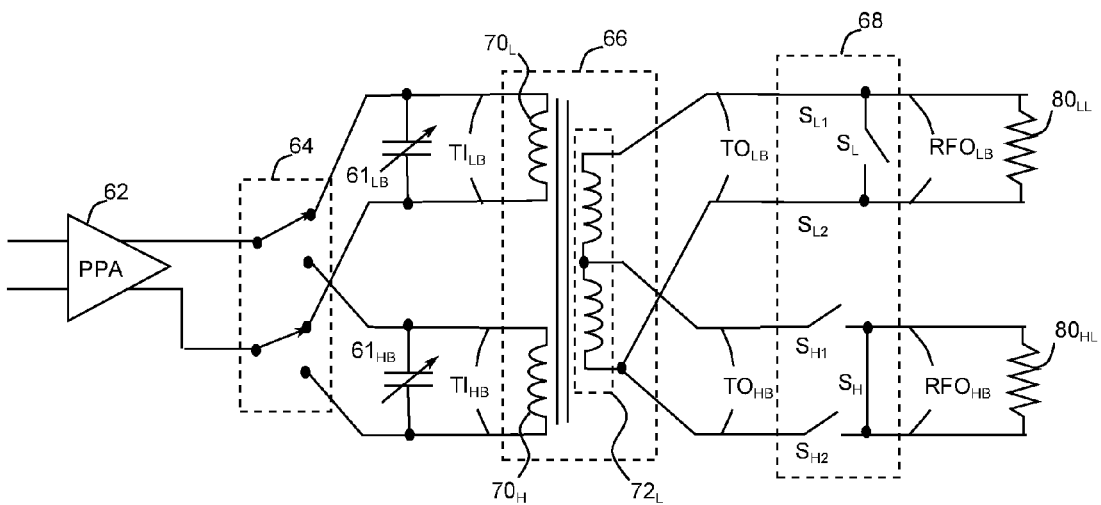
FIG. 6B shows all the switch status for in inbound switch circuit 64 and outbound switch circuit 68 of FIG. 5 in low-band operation.

Analogous to FIG. 6A, FIG. 6B shows all the switch status of the inbound switch circuit 64 and the outbound switch circuit 68 when the multiband transceiver 60 operates at low-band frequencies. As shown in FIG. 6B, the low-band input port $TI_{LB}$ and the pre power amplifier 62 are connected by the inbound switch circuit 64, and the low-band output port $TO_{LB}$ and the RF port $RFO_{LB}$ for RF load $80_{LL}$ are connected by the outbound switch circuit 68. In the low-band operation, the high-band input port $TI_{HB}$ and the high-band output port $TO_{HB}$ are unselected, or left open. Inside the outbound switch circuit 68, the switch $S_L$, $S_{H1}$, and $S_{H2}$ are open and the switch $S_H$, $S_{L1}$, and $S_{L2}$ are shorted. RF signals with low-band frequencies thus follow the signal path through the pre power amplifier 62, the low-band input port $TI_{LB}$, the primary winding $70_L$ and secondary winding $72_L$ of the transformer 66, the low-band output port $TO_{LB}$ and the RF port $RFO_{LB}$ for RF output load $80_{LL}$ to reach an external power amplifier for signal amplification and transmission, so as to perform corresponding low-band operations.

In short, each primary winding of the trifilar transformer 66 is dedicated to one band operations. The whole secondary winding $72_L$ of the trifilar transformer 66 is used for low-band operations while only a portion of the secondary winding $72_L$ is used for high-band operations.

In the low-band operation, the inbound switch circuit 64 and the outbound switch circuit 68 together help the trifilar transformer 66 to magnetically transfer RF output load 80$_{LL}$ from low-band output port TO$_{LB}$ to low-band input port TI$_{LB}$, so as to form an intermediate load impedance at the output of the pre power amplifier 62. In the high-band operation, the trifilar transformer 66 magnetically transfers RF output load 80$_{HL}$ from high-band output port TO$_{HB}$ to high-band input port TI$_{HB}$, to form another intermediate load impedance at the output of the pre power amplifier 62.

Transceiver 60 is easy to design in light of resonant frequency tuning and loadline impedance optimization. For high-band operations, the resonant frequency is determined by the tunable capacitor 61$_{HB}$ and the primary winding 70$_H$, while loadline impedance, exemplified in FIG. 4B, is substantially determined by turn ratio n$_H$ and coupling coefficient k$_{mH}$. Here, k$_{mH}$ is the coupling coefficient between the primary winding 70$_H$ and the secondary winding 72$_H$, and the turn ratio n$_H$ is approximately $\sqrt{L_{72H}/L_{70H}}$. L$_{70H}$ and L$_{72H}$ are the inductances of the primary winding 70$_H$ and the secondary winding 72$_H$, respectively, or the inductances looking into high-band input port TI$_{HB}$ and output port TO$_{HB}$, respectively. Similarly, for low-band operations, the tunable capacitor 61$_{LB}$ and the primary winding 70$_L$ determine the resonant frequency, and turn ratio n$_L$ and coupling coefficient k$_{mL}$ determine the loadline impedance, where k$_{mL}$ is the coupling coefficient between the primary winding 70$_L$ and the secondary winding 72$_L$, the turn ratio n$_L$ is approximately $\sqrt{L_{72L}/L_{70L}}$, and L$_{70L}$ and L$_{72L}$ are the inductances of the primary winding 70$_L$ and the secondary winding 72$_L$, respectively, or the inductances looking into low-band input port TI$_{LB}$ and output port TO$_{LB}$, respectively. Both of the coupling coefficients k$_{mH}$ and k$_{mL}$ are preferably to be close to 1 for small magnetic-flux leakage. If the tunable capacitor 61$_{HB}$ has about the same capacitance as the tunable capacitor 61$_{LB}$, the primary windings 70$_L$ and 70$_H$ can be determined by choosing $\sqrt{L_{70L}/L_{70H}}$ equal to $$\frac{f_H}{f_L},$$

where f$_H$ and f$_L$ are two desired resonant frequencies in high-band and low-band operations respectively. Thus, L$_{70L}$ is larger than L$_{70H}$. The secondary winding 72$_H$ is then determined by the turn ration n$_H$, based on the requirement of the loadline impedance and PAE in high-band operations, as taught by FIG. 4B. After setting parameters pertaining to the secondary winding 72$_H$, the difference between the secondary winding 72$_L$ and the secondary winding 72$_H$ can be determined by having an appropriate turn ratio n$_L$ to match the requirement of the loadline impedance and PAE for low-band operations. As shown in FIG. 5, the secondary winding 72$_L$ can be formed by connecting an additional winding 72$_{ADD}$ in series with the secondary winding 72$_H$ without interfering inductance L$_{72H}$, which is the inductance seen from output port TO$_{HB}$. In other words, the design of secondary winding 72$_L$ can be decoupled from the design of secondary winding 72$_H$. As a result, the loadline impedances for high-band and low-band operations can be independently optimized, such that PAE for both high-band and low-band operations are also optimal. In one embodiment, the inductance ratio L$_{72H}$/L$_{70H}$ is approximately equal to L$_{72L}$/L$_{70L}$, implying that the turn ratio n$_H$ is substantially the same as n$_L$, and the loadline impedance is approximately the same for both high-band and low-band operations. Of course, the present invention is not limited to, and the inductance ratio L$_{72H}$/L$_{70H}$ could be configurable and different from L$_{72L}$/L$_{70L}$ in other embodiments.

The embodiment disclosed in FIG. 5 has only one common transformer for different band operations, resulting in a smaller silicon cost when compared with those using multiple transformers for multiband operations. Furthermore, the secondary winding 72$_H$, whose inductance determines the loadline impedance and PAE during high-band operations, is efficiently reused when the transceiver 60 operates in a low-band mode, decreasing the overall size of the transformer 66. Parameters of the primary winding 70$_H$ and the secondary winding 72$_H$ are chosen to meet performance requirement in high-band operations, such as resonant tuning, loadline impedance, and PAE. Parameters of the primary winding 70$_L$ and the secondary winding 72$_L$ can be simultaneously optimized without any performance degradation in the low band. In conclusion, transceiver 60 can be optimized to meet both the required performances for high-band and low-band operations.

Figure 1:
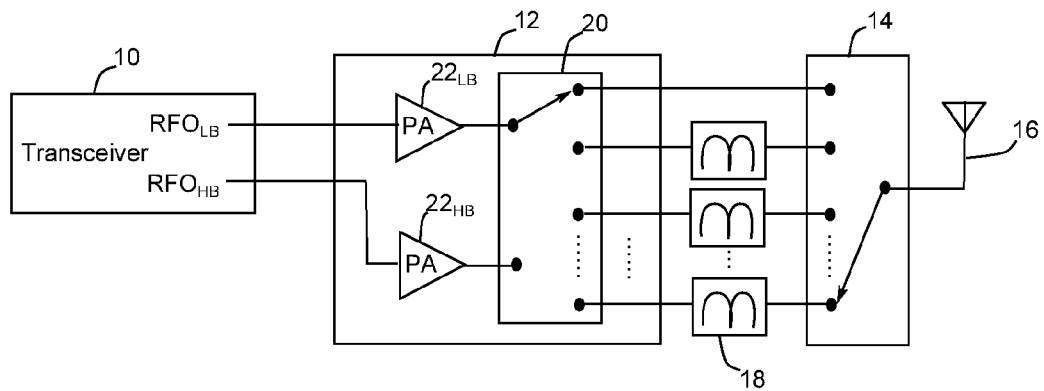
FIG. 1 shows a smart phone block diagram based on converged power amplifier architecture.
Figure 2:
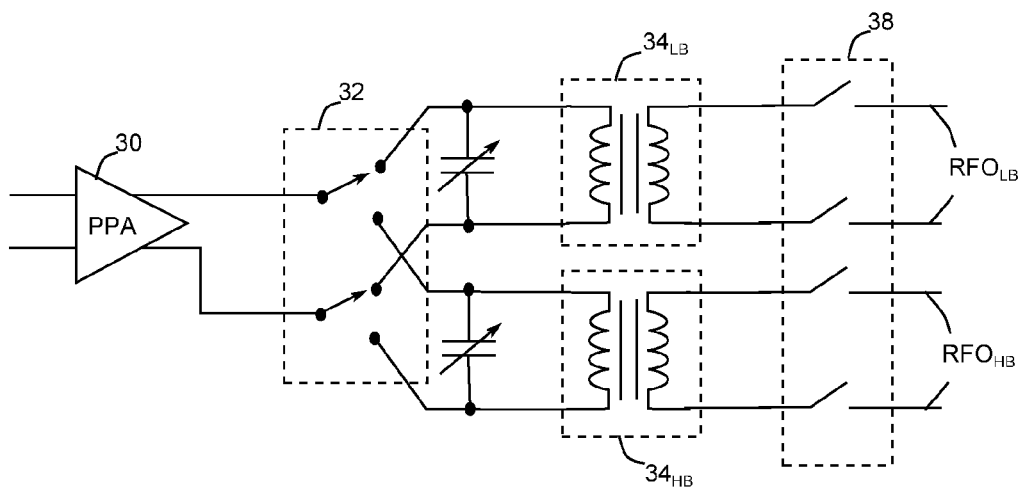
FIG. 2 demonstrates a conventional solution for a transceiver with two RF-signal paths.
Figure 3A:
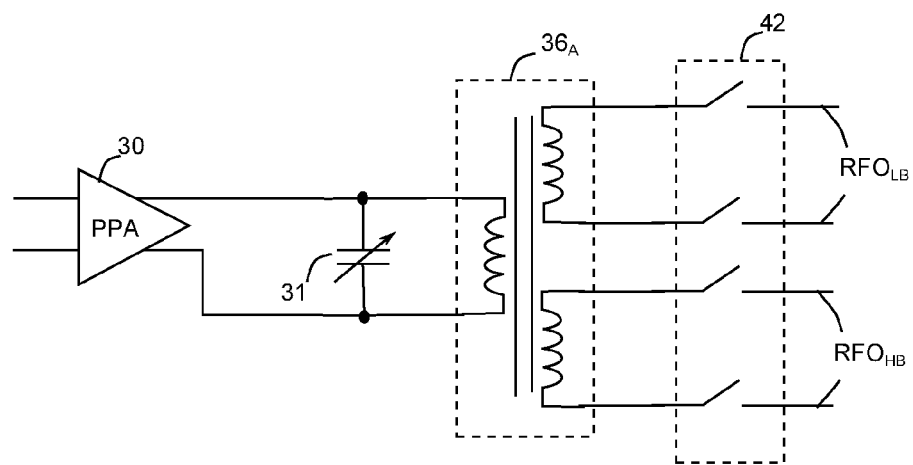
FIGS. 3A and 3B demonstrate two alternatives to the solution suggested in FIG. 2.
Figure 3B:
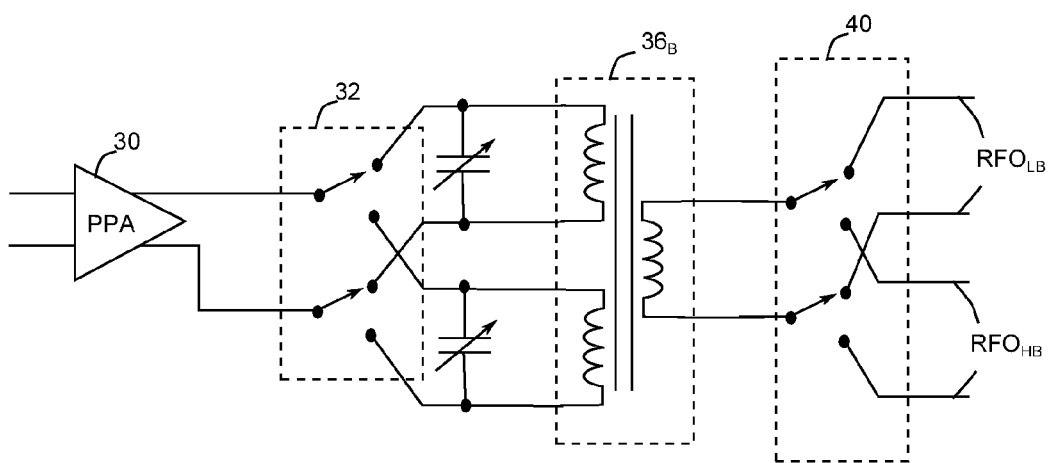
Figure 4A:
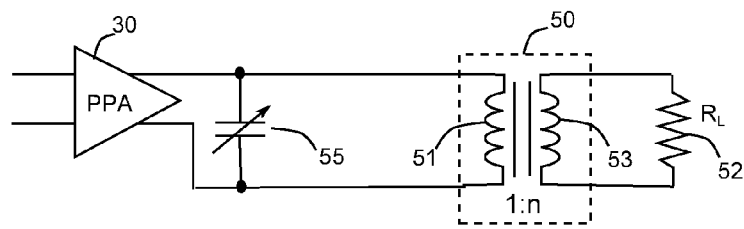
FIG. 4A shows a transformer with properly-selected primary and secondary windings.
Figure 4B:
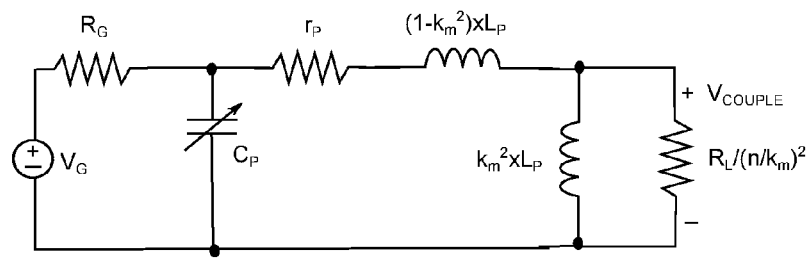
FIG. 4B is an equivalent circuit of FIG. 4A.
Figure 7A:
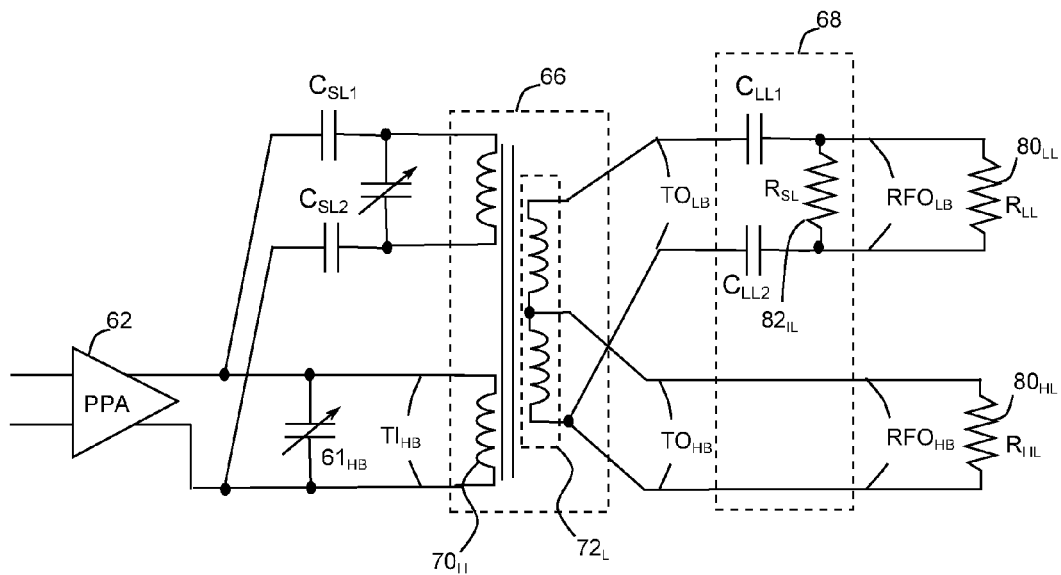
FIG. 7A shows the circuit of FIG. 6A with parasitic capacitance and resistance of real output switches.
Figure 7B:
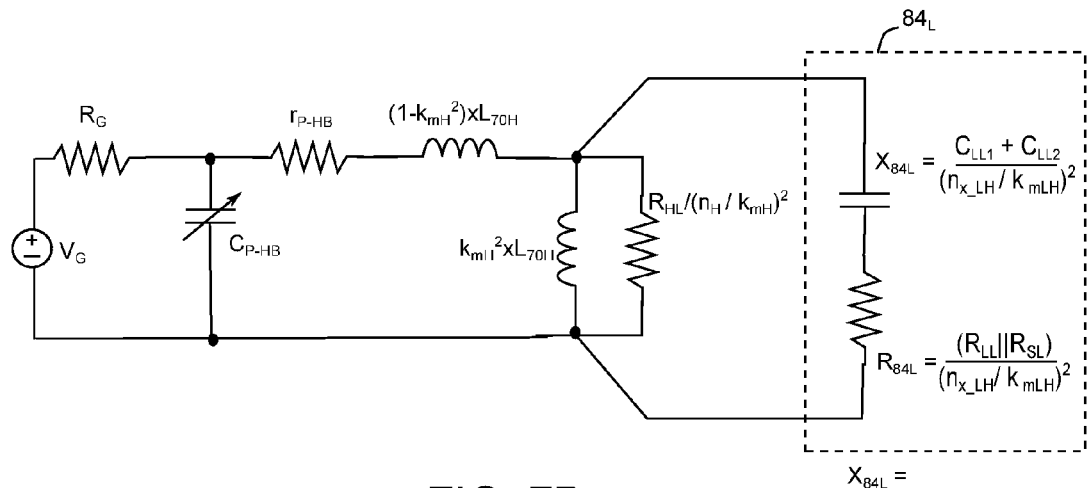
FIG. 7B demonstrates an equivalent circuit of FIG. 7A.

According to the prior art, the transformers depicted in FIGS. 4A and 4B are under the assumption that switch circuits are ideal, meaning each switch in switch circuits, if acting as an open circuit, blocks the transmission of not only DC signals but also AC signals. In reality, it is not the case because switches in integrated circuits are commonly implemented by transistors, which have finite impedance in off-state due to parasitic capacitance among transistor terminals. Since the impedance is capacitive, the impedance is decreased as the operating frequency increases. As shown in FIG. 7A, the switches, S$_{L1}$ and S$_{L2}$, in off-state become two capacitors C$_{LL1}$ and C$_{LL2}$ with finite impedance, resulting in poor isolation between the trifilar transformer 66 and RF port RFO$_{LB}$. The RF output load 80$_{LL}$ is inevitably and partially transferred to TT$_{HB}$ by trifilar transformer 66, and the loadline impedance in the high-band operation could be deviate from an optimal point. Here, a switch S$_L$ in FIG. 6A is employed to mitigate the unwanted effect, caused by parasitic capacitance of off-state switches S$_{L1}$ and S$_{L2}$. FIG. 7A is an alternative embodiment to FIG. 6A with capacitors, C$_{LL1}$, C$_{LL2}$, C$_{SL1}$ and C$_{SL2}$, representing the off-state switches in switch circuits 64 and 68. RF output loads 80$_{HL}$ and 80$_{LL}$, shunt at RF ports RFO$_{HB}$ and RFO$_{LB}$ respectively, represent RF load impedance R$_{HL}$ and R$_{LL}$ looking out from these two RF ports RFO$_{HB}$ and RFO$_{LB}$. Resistor 82$_{IL}$ in FIG. 7A represents the resistance R$_{SL}$ of the on-state switch S$_L$ in FIG. 6A. An equivalent circuit of FIG. 7A is illustrated in FIG. 7B which is analogous to FIG. 4B and is comprehensible to persons skilled in the art based on the teaching aforementioned. Different from FIG. 4B, which has only one reflected load resistor (RL/(n/k$_m$)$^2$), FIG. 7B has another circuit 84$_L$ as a load impedance magnetically transferred from the secondary windings 72$_L$ to the primary winding 70$_H$. Inside the circuit 84$_L$ are a capacitor and a resistor connected in series, to represent the overall transformation result from the capacitors C$_{LL1}$ and C$_{LL2}$, the resistor 82$_{IL}$, and the RF output load 80$_{LL}$ on the secondary side of the transformer 66 in FIG. 7A. Accordingly, the impedance of the circuit 84$_L$ includes a resistance R$_{84L}$ and a reactance X$_{84L}$, whose relations with the parameters of other components on the secondary side are shown in FIG. 7B, where n$_{x\_LH}$ is approximately $\sqrt{L_{72L}/L_{70H}}$ and k$_{mLH}$ is coupling coefficient between the primary winding 70$_H$ and the secondary winding 72$_L$. Occurrence of the resistance R$_{84L}$ and reactance X$_{84L}$ in FIG. 7B complicates the overall frequency response and could detune the resonance of the L-C network. The reactance X$_{84L}$ can only be minimized to reduce the amount of frequency off-tuning but not completely eliminated since every switch has a size tradeoff between small on-state resistance and high off-state impedance where the desired transistor sizes are large and small respectively while parasitic capacitance is proportional to the transistor size. The switch $S_L$ helps to reduce the effect of the RF output load $80_{LL}$ in high-band operations since switch $S_L$, which is turned on to short RF port $RFO_{LB}$ to AC ground at this moment, has much less resistance than RF output load $80_{LL}$ ($R_{SL}$<$R_{LL}$). When the effective resistance coming from the parallel combination of $R_{SL}$ and $R_{LL}$ is small, the resistance $R_{84L}$ becomes negligible relative to the magnitude of the reactance $X_{84L}$. This makes the impedance of circuit $84_L$ almost purely reactive, and easy to be adjusted or compensated by the tunable capacitor $61_{HB}$. In conclusion, the switch $S_L$ provides a bypass path to isolate the trifilar transformer 66 from RF output load $80_{LL}$, so as to ease resonant tuning for high-band operations. The above analysis is also applicable to low-band operations in that the switch $S_H$, shunt at RF port $RFO_{HB}$ in FIG. 6B, contributes the similar advantages.

Figure 8A:
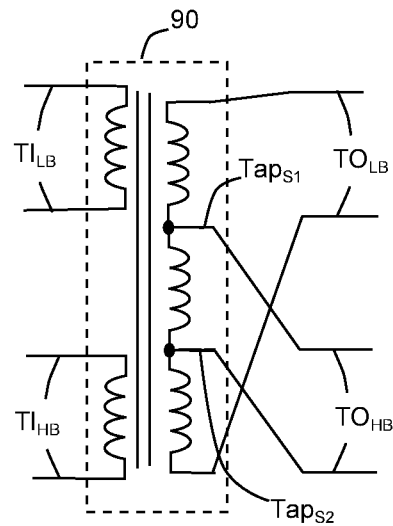
FIG. 8A shows a trifilar transformer with two taps at secondary winding.

Even though a trifilar transformer with one output tap is introduced in FIG. 5, the invention is not limited hereto. Embodiments of the invention could employ different kinds of transformers. As an example, the transformer 66 in FIG. 5 can be replaced by a trifilar transformer 90 with two output taps $Tap_{S1}$ and $Tap_{S2}$ as shown in FIG. 8A. On the secondary side, two output taps $Tap_{S1}$ and $Tap_{S2}$ form a high-band output port $TO_{HB}$, and the two end terminals of the whole secondary winding form a low-band output port $TO_{LB}$.

Figure 8B:
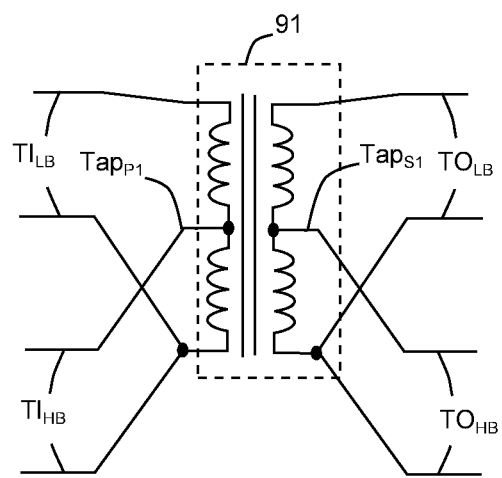
FIG. 8B shows a transformer with only two taps according to one embodiment of the invention.

FIG. 8B demonstrates a transformer 91 applicable to replace the transformer 66 of FIG. 5 in some embodiments of the invention. Transformer 91 has only two taps $Tap_{P1}$ and $Tap_{S1}$. On the primary side, the two end terminals of the whole primary winding form low-band input port $TI_{LB}$, while one end terminal of the whole primary winding and the input tap $Tap_{P1}$ form high-band input port $TI_{HB}$. On the secondary side, similarly, the two end terminals of the whole secondary winding form low-band output port $TO_{LB}$, while one end terminal of the whole primary winding and the output tap $Tap_{S1}$ form high-band output port $TO_{HB}$.

Figure 8C:
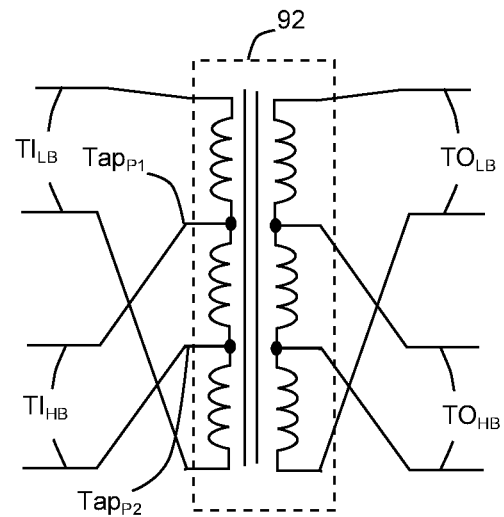
FIG. 8C demonstrates transformer 92 with more than one tap at both primary and secondary windings.

FIG. 8C demonstrates a transformer 92 with multiple input taps and output taps, applicable to replace the transformer 66 of FIG. 5 in some embodiments of the invention. In this particular example, there are two taps on the primary side and another two taps on the secondary side. The two input taps, $Tap_{P1}$ and $Tap_{P2}$, on the primary side of transformer 92 form a high-band input port $TI_{HB}$, while two end terminals of the whole primary winding provide a low-band input port $TI_{LB}$. The two output taps on the secondary side of transformer 92 form high-band output port $TO_{HB}$ and the two end terminals of the secondary winding form low-band output port $TO_{LB}$.

The invention is not limited to two-band operations, but is fully expandable to multiband operations. For example, FIG. 9 demonstrates a multiband transceiver 100 with one PPA 102, an inbound switch circuit 104, a multi-port transformer 106, and an outbound switch circuit 108. The primary windings of transformer 106 provide individual input ports, $TI_1$ to $TI_N$. While the output port $TO_1$ is supported by the whole secondary winding of the transformer 106, each of other output ports, $TO_2$ to $TO_N$, is formed by a tap and one of the end terminals of the secondary winding. One of the input ports, $TI_1$ to $TI_N$, is connected to the PPA 102 through inbound switch circuit 104, and one of the output ports, $TO_1$ to $TO_N$, is connected to one of RF ports, $RFO_1$ to $RFO_N$, through outbound switch circuit 108. In other embodiments, an output port might be formed by any two taps, or by one of the taps and one of end terminals.

Figure 9:
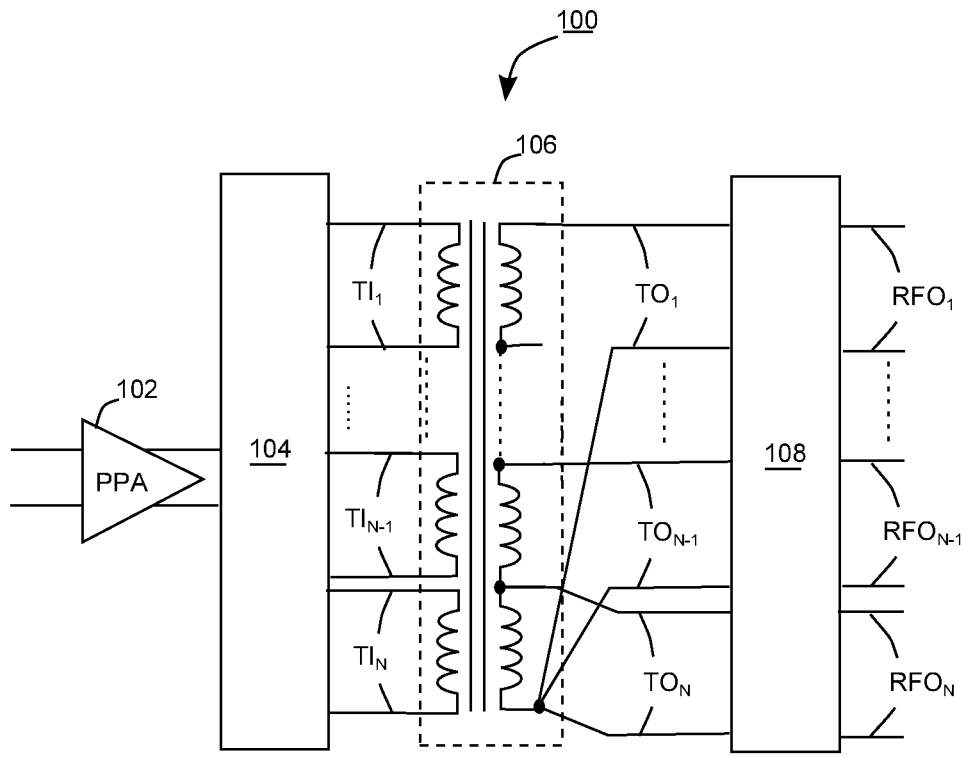
FIG. 9 demonstrates another multiband transceiver according to an embodiment of the invention.
Figure 10A:
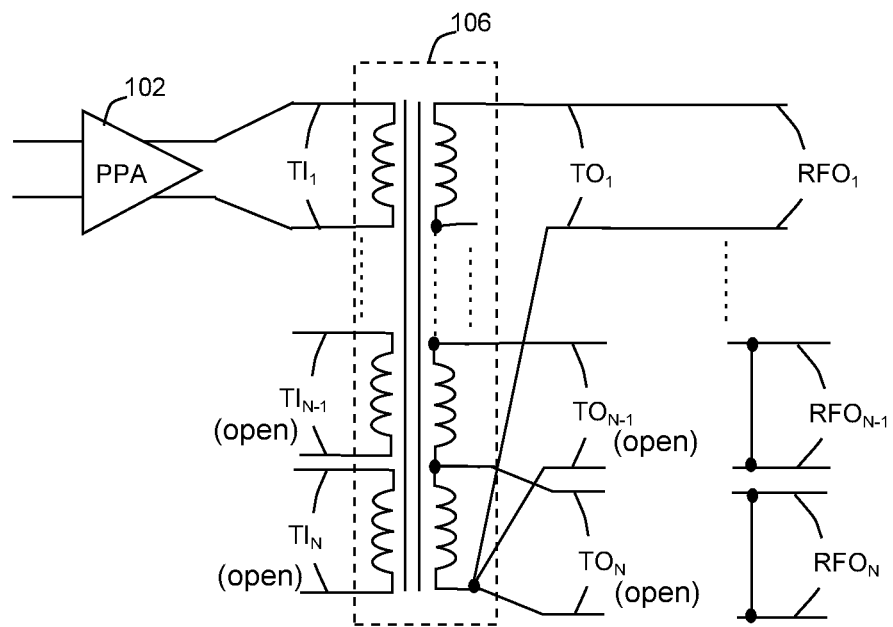
FIG. 10A demonstrates the connection and status of ports in FIG. 9 when transceiver 100 is operated at the $1^{st}$ band.
Figure 10B:
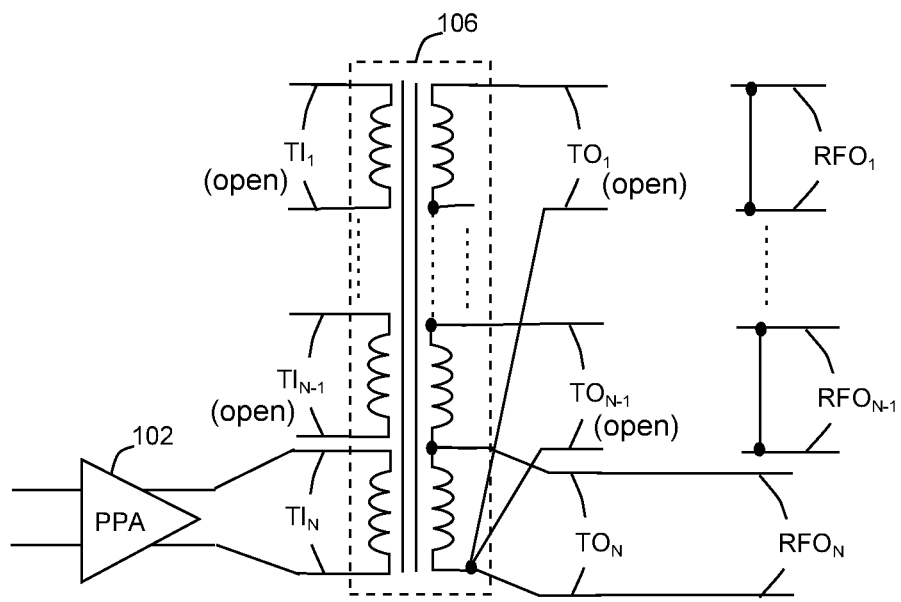
FIG. 10B demonstrates the connection and status of ports in FIG. 9 when transceiver 100 is operated at the $N^{th}$ band.

FIG. 10A demonstrates the connections and status of ports in FIG. 9 when the transceiver 100 operates at a $1^{st}$ band operation. The input port $TI_1$ is selected to connect to the PPA 102 and the output port $TO_1$ is selected to connect to the RF port $RFO_1$, which feeds RF signal to an external power amplifier. Other input ports, $TI_2$ to $TI_N$, and output ports, $TO_2$ to $TO_N$, are all unselected or left open. Each of the RF ports, $RFO_2$ to $RFO_N$, has two terminals shorted each other, to make their influence to the input impedance of input port $TI_1$ almost pure reactive. Similarly exemplified in FIG. 10B is the connections and status of the ports in FIG. 9 when transceiver 100 is at the $N^{th}$ band operation. As comprehensible as it is, explanation of FIG. 10B is omitted in view of brevity.

The transformers according to embodiments of the invention could be monolithic transformers implemented on a silicon chip by metal strips over one or more metal layers. In one embodiment, the transformer 66 of FIG. 5 has all its windings, primary and secondary, interwinding together over a single metal layer to form planar spiral microstrips. In another embodiment, the primary windings of the transformer 66 are spiral inductors over a single metal layer while the secondary winding of the transformer is a spiral inductor over another metal layer. All spiral inductors can be concentrically aligned or have offsets relative to each other.

Even though the invention is embodied in some transmitters to demonstrate its operation, achievement, and benefit, it is not limited hereto. An embodiment of the invention, for example, is a RF receiver with an inbound switch circuit coupled between a trifilar transformer and an antenna which receives RF signal in the air.

Figure 11:
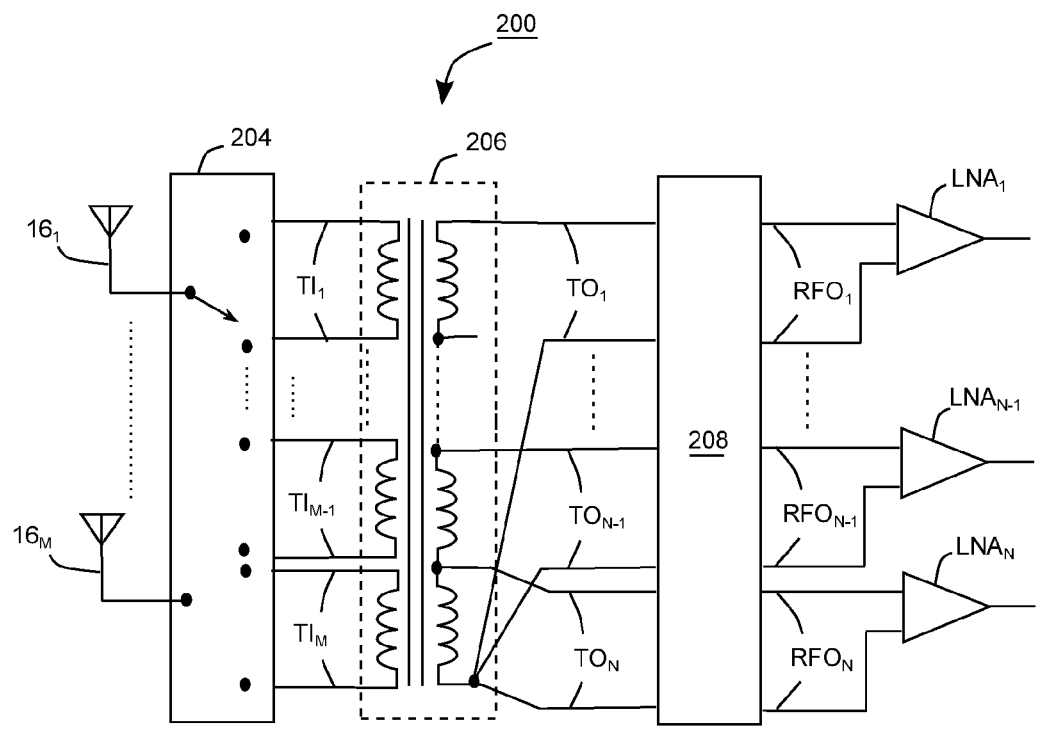
FIG. 11 demonstrates a RF receiver according to an embodiment of the invention.
Figure 12:
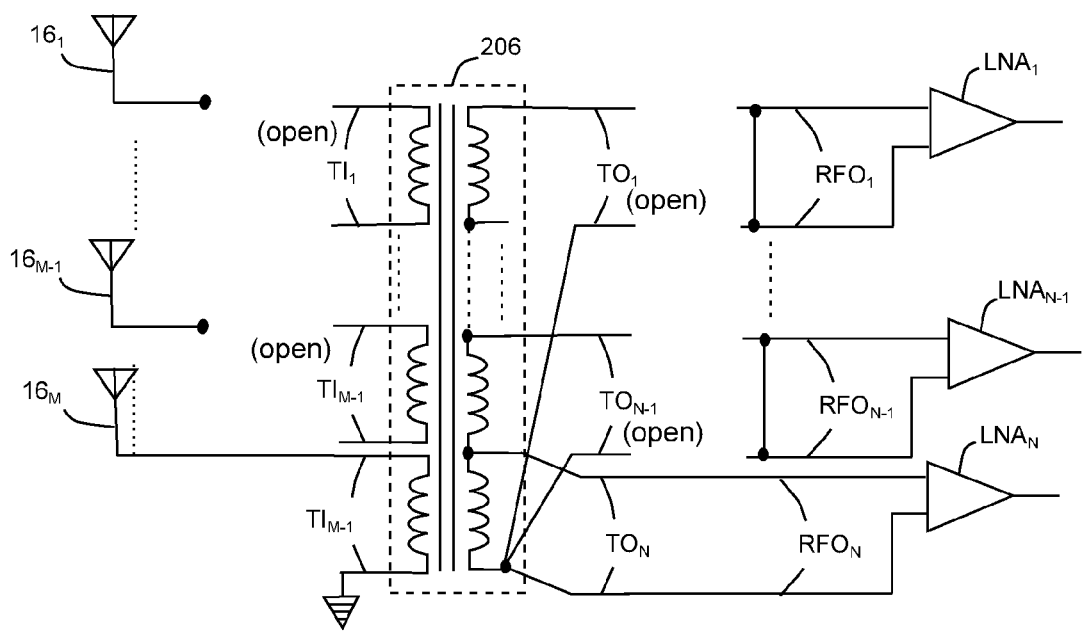
FIG. 12 demonstrates the connections and status of ports in FIG. 11 when RF receiver 200 operates to receive RF signal from antenna $16_M$ and use low noise amplifier $LNA_N$ for signal amplification.

For example, FIG. 11 demonstrates a RF receiver 200 according to an embodiment of the invention. Antennas $16_1$ to $16_M$ are signal sources and, via inbound switch circuit 204, could be connected to or disconnected from input ports $TI_1$ to $TI_M$. Outbound switch circuit 208 is configured to connect one of output ports, $TO_1$ to $TO_N$, to one of low noise amplifiers, $LNA_1$ to $LNA_N$. Even though transformer 206 in FIG. 11 is the same as multi-port transformer 106 in FIG. 9, it could be replaced by any one of the transformers taught in this specification. RF receiver 200 provides one- or multi-impedance transformations for LNAs for input matching, such as gain- and noise-matching. FIG. 12 demonstrates the connections and status of ports in FIG. 11 when RF receiver 200 operates to receive RF signal from antenna $16_M$ and use low noise amplifier $LNA_N$ for signal amplification.

While the invention has been described by way of examples and in terms of a preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A multiband transceiver capable of supporting different bands, comprising:
   a transformer, comprising a plurality of input ports on a primary side, and a plurality of output ports on a secondary side, wherein the plurality of input ports are direct-current isolated from and magnetically coupled to the plurality of output ports;
   an inbound switch circuit, configured to apply a RF signal source to one of the plurality of input ports for signal transmission; and
   an outbound switch circuit, configured to connect one of the plurality of output ports to a RF output load.

2. The multiband transceiver of claim 1, further comprising at least one input tunable capacitor configured to shunt with one of the plurality of input ports and form a LC tank for band selection.

3. The multiband transceiver of claim 1, wherein a high-band output port is connected to a high-band RF output load by the outbound switch circuit when the multiband transceiver operates at a high band, a low-band output port is connected to a low-band RF output load when the multiband transceiver operates at a low band, and an inductance looking into the high-band output port is different from an inductance looking into the low-band output port.

4. The multiband transceiver of claim 3, wherein a high-band input port is connected to the RF signal source when the multiband transceiver operates at the high band, a low-band input port is connected to the RF signal source when the multiband transceiver operates at the low band, and the inductance looking into the high-band input port is different from the inductance looking into the low-band input port.

5. The multiband transceiver of claim 4, the inductance looking into the low-band input port comprises the inductance looking into the high-band input port.

6. The multiband transceiver of claim 4, the inductance looking into the low-band output port comprises the inductance looking into the high-band output port.

7. The multiband transceiver of claim 4, wherein a turn ratio of the high-band input port to the high-band output port is substantially the same as a turn ratio of the low-band input port to the low-band output port.

8. The multiband transceiver of claim 4, wherein a turn ratio of the high-band input port to the high-band output port is different from a turn ratio of the low-band input port to the low-band output port.

9. The multiband transceiver of claim 1, wherein one of input ports is connected to the RF signal source by the inbound switch circuit.

10. The multiband transceiver of claim 1, wherein one of output ports is connected toh the RF output load by the outbound switch circuit.

11. The multiband transceiver of claim 1, wherein the inbound switch circuit is configured to connect one of the input ports to the RF signal source, and to disconnect any other input ports from the RF signal source.

12. The multiband transceiver of claim 1, wherein the outbound switch circuit is configured to connect a selected output port to a selected RF output load, and to disconnect any unselected ports from other RF output loads.

13. The multiband transceiver of claim 1, wherein the transformer further comprises an input tap on the primary side.

14. The multiband transceiver of claim 13, wherein the transformer further comprises a plurality of input taps on the primary side.

15. The multiband transceiver of claim 1, wherein the transformer further comprises an output tap on the secondary side.

16. The multiband transceiver of claim 15, wherein the transformer further comprises a plurality of output taps on the secondary side.

17. The multiband transceiver of claim 16, wherein the transformer further comprises a plurality of input taps on the primary side.

18. The multiband transceiver of claim 15, wherein the transformer further comprises an input tap on the primary side.

19. The multiband transceiver of claim 1, wherein the RF output load is one of RF load impedances looking out from RF ports, and when operating at a first band, the outbound switch circuit connects a first output port with a first RF port and disconnects a second output port from a second RF port.

20. The multiband transceiver of claim 19, wherein the outbound switch circuit comprises a plurality of shunt switches correspondingly coupled to the plurality of RF output ports; when operating at a first band, a first shunt switch of the plurality of shunt switches coupled to the first RF port is turned off, and a second shunt switch of the plurality of shunt switches coupled to the second RF port is turned on.

21. The multiband transceiver of claim 1, wherein the inductances looking into the input ports are individually designed based on a band specification, and a turn ratio of a connected input port to a connected output port is determined by a desired loadline impedance, output power or PAE.

22. The multiband transceiver of claim 1, wherein the RF signal source is a pre power amplifier.

23. The multiband transceiver of claim 1, wherein the RF output load is an input impedance of a power amplifier.

24. The multiband transceiver of claim 1, wherein the transformer is a monolithic transformer having windings formed by spiral-shaped inductors with a same magnetic coil.

25. The multiband transceiver of claim 1, wherein the RF signal source is one of antennas.

26. The multiband transceiver of claim 1, wherein the RF output load is an input impedance of one of low noise amplifiers.

27. A method for supporting multiband communication, comprising:
   providing a transformer with a plurality of input ports on a primary side, and a plurality of output ports on a secondary side, wherein the plurality of input ports are direct-current isolated from and magnetically coupled to the plurality of output ports;
   applying an RF signal source to a first input port of the plurality of input ports and a first RF output load to a first output port of the plurality of output ports when operating at a first band; and
   applying the RF signal source to a second input port of the plurality of input ports and a second RF output load to a second output port of the plurality of output ports when operating at a second band;
   wherein the frequency of the first band is higher than that of the second band.

28. The method of claim 27, wherein the step of applying the RF signal source to the first input port comprises: disconnecting the second input port from the RF signal source.

29. The method of claim 27, wherein the step of applying the RF signal source to the first input port comprises: disconnecting the second output port from the second RF output load.

30. The method of claim 27, wherein the first and second RF output loads are RF load impedances looking out from first and second RF ports respectively, and the step of connecting the first input port to the RF signal source comprises shorting the second RF port to AC ground.

31. The method of claim 27, wherein a turn ratio of the first input port to the first output port is substantially the same with a turn ratio of the second input port to the second output port.

32. The method of claim 27, wherein a turn ratio of the first input port to the first output port is different from a turn ratio of the second input port to the second output port.

33. The method of claim 27, wherein a winding looking into the second input port comprises a winding looking into the first input port.

34. The method of claim 27, wherein a winding looking into the second output port comprises a winding looking into the first output port.

35. The method of claim 27, wherein the transformer further comprises an input tap on the primary side.

36. The method of claim 35, wherein the transformer further comprises a plurality of input taps on the primary side.

37. The method of claim 27, wherein the transformer further comprises an output tap on the secondary side.

38. The method of claim 37, wherein the transformer further comprises a plurality of output taps on the secondary side.

39. An operation method for supporting multiband communication in a radio frequency (RF) receiver, comprising:
   selecting a first-band signal from a signal source by shunting a capacitor with a first input port to form a first-bank LC tank;
   magnetically transferring a first RF output load from a first output port to the first input port, to form an intermediate load impedance at the output of the signal source in a first-band operation;
   selecting a second-band signal from the signal source by shunting a capacitor with a second input port to form a second-bank LC tank; and
   magnetically transferring a second RF output load from a second output port to the second input port, to form another intermediate load impedance at the output of the signal source in a second-band operation;
   wherein the inductors looking into the first and second input ports, and the first and second output ports share a common magnetic core.

40. The operation method of claim 39, wherein the first-band signal has higher center frequency than the second-band signal.

41. The operation method of claim 40, wherein an inductance looking into the first input port is different from an inductance looking into the second input port.

42. The operation method of claim 40, wherein an inductor looking into the second input port comprises an inductance looking in the first input port.

43. The operation method of claim 40, an inductance looking into the second output port comprises an inductance looking into the first output port.

44. The operation method of claim 39, the step of magnetically transferring the first RF output load from the first output port to the first input port comprises:
   magnetically transferring, from the second output port to the first input port, the second RF output load and a series-connected off-state switch; and turning on another switch shunt at the second RF output load to eliminate an resistive effect of the second RF output load to improve an impedance of resonance (Q) of the first-band LC tank.

45. The operation method of claim 39, the step of magnetically transferring the second RF output load from the second output port to the second input port comprises:
   magnetically transferring, from the second output port to the first input port, the first RF output load and a series-connected off-state switch; and turning on another switch shunt at the first RF output load to eliminate an resistive effect of the first RF output load to improve an impedance of resonance (Q) of the second-band LC tank.

* * * * *